United States Patent [19]

Hansen

[11] Patent Number: 5,310,803
[45] Date of Patent: May 10, 1994

[54] HOT-MELT COMPOSITION THAT HAVE GOOD OPEN TIME AND FORM CREEP-RESISTANT BONDS WHEN APPLIED IN THIN LAYERS

[75] Inventor: Dennis D. Hansen, Luck, Wis.

[73] Assignee: Minnesota Mining and Manufacturing Company, St. Paul, Minn.

[21] Appl. No.: 809,004

[22] Filed: Dec. 17, 1991

Related U.S. Application Data

[63] Continuation-in-part of Ser. No. 721,916, Jun. 20, 1991, which is a continuation of Ser. No. 190,039, May 4, 1988, abandoned.

[51] Int. Cl.$^5$ ............................................. C08L 33/06
[52] U.S. Cl. .................................. 525/228; 524/271; 428/42; 428/261; 428/334; 428/335; 428/355; 428/364
[58] Field of Search ................ 524/271; 525/228; 428/42, 261, 364, 334, 335, 355

[56] References Cited

U.S. PATENT DOCUMENTS

| | | | |
|---|---|---|---|
| T900,017 | 7/1972 | Gordy | 524/271 |
| 3,422,551 | 1/1969 | Blank et al. | 36/77 |
| 3,615,106 | 10/1971 | Flanagan et al. | 281/21 |
| 3,884,786 | 5/1975 | Domine et al. | 205/159.14 |
| 4,140,733 | 2/1979 | Meyer, Jr. et al. | 524/271 |
| 4,146,521 | 3/1979 | Godfrey | 428/461 |
| 4,167,433 | 9/1979 | Lakshmanan | 156/322 |
| 4,192,788 | 3/1980 | Dodson | 524/271 |
| 4,299,930 | 11/1981 | Boggs | 524/271 |
| 4,338,227 | 7/1982 | Ballard | 525/228 |
| 4,404,299 | 9/1983 | Decroix | 524/77 |
| 4,434,261 | 2/1984 | Brugel et al. | 524/109 |
| 4,460,728 | 7/1984 | Schmidt, Jr. et al. | 524/271 |
| 4,500,661 | 2/1985 | Lakshmanan | 524/77 |
| 4,588,767 | 5/1986 | Schoenberg et al. | 524/272 |
| 4,613,632 | 9/1986 | Aliani et al. | 523/172 |
| 4,618,640 | 10/1986 | Tsuchida et al. | 524/272 |
| 4,772,650 | 9/1988 | Ou-Yang | 524/271 |
| 4,816,306 | 3/1989 | Brady et al. | 524/275 |
| 4,874,804 | 10/1989 | Brady et al. | 524/275 |
| 4,895,567 | 1/1990 | Colon et al. | 524/271 |
| 4,912,169 | 3/1990 | Whitmire et al. | 525/228 |
| 5,066,711 | 11/1991 | Colon et al. | 524/271 |

FOREIGN PATENT DOCUMENTS

| | | |
|---|---|---|
| 0203251 | 12/1986 | European Pat. Off. . |
| 0340990 | 11/1989 | European Pat. Off. . |
| 0348200 | 12/1989 | European Pat. Off. . |
| 2523617 | 12/1976 | Fed. Rep. of Germany . |
| 2636970 | 2/1978 | Fed. Rep. of Germany . |
| 0230008 | 11/1985 | German Democratic Rep. . |
| 452104 | 1/1970 | Japan . |
| 0465412 | 3/1975 | U.S.S.R. . |
| 1233797 | 5/1971 | United Kingdom . |

OTHER PUBLICATIONS

Duncan et al., "EVA and VAE Copolymers for Hot Melt PSA's *Adhesives Age*," Mar., 1990, pp. 37–41.

Wielinski, "EnBA Resins Give Hot Melts More Heat and Oil Resistance" *Adhesives Age*, Nov., 1989, pp. 30–33.

*Primary Examiner*—John Kight, III
*Assistant Examiner*—Rabon Sergent
*Attorney, Agent, or Firm*—Gary L. Griswold; Walter N. Kirn; Steven E. Skolnick

[57] ABSTRACT

A hot-melt composition comprising an ethylene/vinyl acetate copolymer, an ethylene/n-butyl acrylate copolymer, and a tackifying resin can be spread into a thin layer that has a limited open time of at least 5 seconds. The composition eventually crystallizes to form a creep-resistant bond.

41 Claims, No Drawings

HOT-MELT COMPOSITION THAT HAVE GOOD OPEN TIME AND FORM CREEP-RESISTANT BONDS WHEN APPLIED IN THIN LAYERS

CROSS-REFERENCE TO RELATED APPLICATIONS

This application is a continuation-in-part of pending application Ser. No. 07/721,916 filed Jun. 20, 1991, which is a continuation of application Ser. No. 07/190,039 filed May 4, 1988, now abandoned.

BACKGROUND OF THE INVENTION

1. Field of the Invention

This invention relates generally to hot-melt compositions and, more particularly, to hot-melt compositions based on ethylene/vinyl acetate (EVA) copolymers, ethylene/n-butyl acrylate (EnBA) copolymers and tackifying resins. Hot-melt compositions according to the invention have good open time and form creep-resistant bonds when applied in thin layers.

2. Description of the Related Art

Hot-melt compositions are generally understood to comprise thermoplastic materials which are solid at room temperature but which readily melt to a viscous liquid upon heating. The molten composition is applied to a substrate and the substrate is mated to a second surface. As the composition cools, it rapidly solidifies and then crystallizes or "sets up" thereby forming a bond between the substrate and the second surface. Accordingly, the term "set time" has been adopted to define the time required for the hot-melt composition to crystallize and the bond between the substrate and the second surface to form after the substrate and the second surface have been mated.

"Set time" is to be distinguished from "open time" (sometimes referred to herein as "tack bonding range") which refers to the time over which the hot-melt composition remains tacky after having been applied to an unheated, room temperature (about 20° to 22° C.) substrate. Once the "open time" has been exceeded, the hot-melt composition becomes tack-free and the substrate and the second surface cannot be successfully mated unless the composition is capable of being reactivated (i.e., the composition can be rendered tacky again).

Typical uses for hot-melt compositions include the high speed, automated assembly of low strength products such as in bookbinding and packaging operations. Hot-melt compositions have traditionally been applied to a substrate as a bead. When applied in bead form, presently known hot-melt compositions may offer two advantageous properties, an open time of at least 5 seconds coupled with a relatively short set time. An open time of at least 5 seconds allows ample time for mating the surfaces to be bonded while a short set time indicates that the bond has crystallized to the extent that the mated surfaces no longer need to be clamped or held together. A short set time permits bookbinding and cardboard carton assembly equipment to be operated at maximum speed.

Another characteristic demonstrated by such compositions is their ability to form "creep resistant" bonds. "Creep resistance" refers to the capacity of a bond to sustain a constant load under a constant stress. A bond which "creeps" moves slowly when under stress. Items bonded together by an adhesive which tends to "creep" will move, may not stay in place and may even fail. A bond which is "creep-resistant" combats this tendency.

However, it is not always desirable to apply a hot-melt composition as a bead. When a bead of adhesive is deposited on a substrate and a second surface is mated thereto, the bead is compressed and spreads out between the substrate and the second surface. In some instances, the composition may be squeezed out beyond the edges of the mated surfaces creating a messy, unaesthetic appearance. Alternatively, the composition may not fully extend to the edges of the mated surfaces thereby creating a situation referred to as "edge gap" which increases the opportunity for delamination of the substrate and the second surface. In general, when a hot-melt composition is distributed between a substrate and a second surface by compressing a bead of the composition, it is difficult to obtain a layer of the composition which uniformly covers the substrate and which is of substantially equal thickness throughout. Failure to achieve such a distribution is particularly problematic when bonding relatively thin substrates since the uneven application of the hot-melt composition may be telegraphed through the substrate (i.e., the uneven application of the hot-melt composition becomes visually apparent).

The application of hot-melt compositions as beads has been associated with other undesirable occurrences. Beads may wick through the substrate, especially if the substrate is thin. Also, a bead may indelibly stain a porous substrate.

Accordingly, there is considerable need for a hot-melt composition which may be usefully applied to a substrate in a thin layer. Such a hot-melt composition would offer extraordinary advantages over hot-melt compositions which are applied as beads. For example, the composition could be uniformly applied to the entire surface of a substrate in a layer of substantially constant thickness. The likelihood that the composition would be squeezed out beyond the edges of the substrate or would not fully extend to the edges thereof would be greatly reduced. Similarly, a thin layer would be less likely to telegraph through, wick through, or permanently stain a substrate.

Presently known hot-melt compositions, when spread as a thin layer on a room temperature substrate, do crystallize to form creep-resistant bonds. Unfortunately, these compositions also exhibit a very short open time on the order of 1 to 2 seconds. While an open time of such short duration may be acceptable in certain applications, such as some high speed, automated cardboard carton sealing operations where the surfaces to be mated can be brought together within 1 to 2 seconds of the adhesive having been deposited, in other instances it is desirable to have an open time of at least 5 seconds. For example, in the construction of signs, advertising displays and other articles having a relatively large surface area (as compared to the sealing of cardboard cartons), a relatively long open time adhesive may be required so as to provide ample time in which to complete the assembly of the article while the adhesive remains tacky.

In other industries such as lithography, die cut parts and costume jewelry, the two parts which are to be adhesively bonded must be carefully and precisely positioned with respect to each other. An adhesive with an open time of at least 5 seconds provides the assembler of such components sufficient time to accurately position the bonded parts and, if necessary, to reposition them until they are properly aligned. The 1 to 2 seconds of open time afforded by presently known hot-melt adhesives when spread in a thin layer is simply too short to allow for precision placement. (The adhesive becomes nontacky before the components can be properly positioned.)

Pressure sensitive adhesives are a class of materials which are essentially permanently tacky at room temperature and may be regarded as having a virtually infinite open time. Intuitively, materials having a virtually infinite open time would appear to be well-suited to the construction of large surface area articles or precision components because of the long time during which the construction of these articles could be completed. However, such is not the case. As the open time of an adhesive increases, the opportunity for dirt and other materials to contaminate the adhesive surface is enhanced because the tacky adhesive readily retains the same. Contaminants are asthetically displeasing, especially in articles such as costume jewelry. More importantly, contaminants deposited on the adhesive surfaces prior to bonding can weaken the ultimate strength of the bond by reducing the available surface area of the adhesive.

The virtually infinite open time of a pressure sensitive adhesive can pose long term storage and inventory management problems too. For example, the manufacture of certain articles such as signs and advertising displays may involve laminating several panels together to provide the finished article. The number and types of panels required will depend on the ultimate size of the articles, where the articles are to be placed, and customer preferences. Consequently, it may be desirable for a manufacturer of such articles to maintain an inventory of panels which have been precoated with an adhesive to facilitate the rapid assembly of the finished articles upon customer demand. However, if these panels are coated with a pressure sensitive adhesive, the essentially permanently tacky surface will readily retain dust and dirt, rendering the useful storage of precoated panels virtually impossible. Also, the precoated panels can not be conveniently stacked (unless expensive and unwieldy release liners are employed) since they will adhere to adjacent panels in the stack.

Consequently, it would be desirable for the adhesive used to precoat such panels to have a limited open time such that the panels could be readily prepared in advance and stored. Of course, the adhesive would have to be capable of being reactivated (i.e., restored to a tacky condition) so that assembly of the finished articles could be subsequently completed.

Furthermore, pressure sensitive adhesive compositions (even those which are considered hot-melt pressure sensitive adhesives) do not form creep-resistant bonds when spread in a thin layer. As noted above, items bonded together by an adhesive which tends to creep will move, may not stay in place, and may even fail. In the bonding of precision components, a creep-resistant adhesive helps prevent movement which would otherwise disturb the accurate positioning of the components.

Thus, it would be desirable for a hot-melt composition when spread in a thin layer to have a limited open time; that is, an open time greater than about 5 seconds (so as to exceed conventional hot-melt compositions) but which is not virtually infinite (so as to decrease the opportunity for dirt contamination as happens with conventional pressure sensitive adhesives).

Hot-melt compositions are often applied with dispensers commonly referred to as "glue guns." In these devices, the composition is provided in the form of a relatively hard, rigid stick or rod which is pneumatically or mechanically driven into an electrically heated well or chamber at the rear of the device. Most presently known compositions require that the well be heated to a temperature of at least about 350° to 400° F. (177° to 204° C.) to melt the composition and to reduce its viscosity. The molten composition is forced through a barrel-like portion of the device and exits from the opposite end thereof to be applied to a substrate. The temperature of the molten composition upon discharge is typically about 330° to 380° F. (166° to 193° C.).

Hot-melt compositions which must be applied at a temperature of about 350° to 400° F. (177° to 204° C.) pose unique problems whether deposited as a bead or a thin film. For example, at these temperatures, a negligent user of the hot-melt composition may be seriously burned by contact with the same. Also, such compositions cannot be used in conjunction with relatively heat sensitive substrates (e.g., expanded polystyrene) as the same may melt. Furthermore, such hot-melt compositions can be more difficult to apply. Because of the relatively high melting temperatures, a large power supply is needed to heat the glue gun chamber so as to melt the adhesive rod, thereby limiting the ability to use a portable power supply (such as batteries, for example). Similarly, the time required to heat the glue gun to the proper operating temperature is increased.

The use of EVA copolymers in hot-melt applications is mentioned in several references. U.K. Pat. Spec. No. 1,233,797 to Cheetham et al., published May 26, 1971, states: "Known hot-melt adhesives for bonding paper stocks are 100% solids systems consisting of, for example, a mixture of an ethylene/vinyl acetate copolymer, a resin and a wax. . . . It has been found, however, that bonds between paper substrates formed with these adhesives exhibit unacceptable creep or part completely at temperatures of about 50° C. Packs made under such adhesives fail under tropical storage conditions" (Page 1, lines 15-38.)

By 1980, as reported in Duncan et al., "EVA 7 and EVA Copolymers for Hot-melt PSA's," *Adhesives Age,* March 1980, pp 37-41: "Ethylene/vinyl acetate (EVA) copolymers are well established as the base polymer for hot-melt package sealing adhesives." Duncan et al. disclose that EVA copolymers may be blended with various tackifying resins so as to provide pressure sensitive adhesives. The open time or tack bonding range and creep resistance of the resulting bonds are not discussed, but the article concludes that EVAs in combination with ester resins or aromatic hydrocarbons "can be formulated in hot-melts suitable for pressure-sensitive tapes and labels but appear to lack the shear strength required for structural applications."

U.S. Pat. No. 4,613,632 to Aliani et al. discloses an EVA-based hot-melt adhesive that includes a resin which functions as a tackifier and which also assists wetting. The Aliani et al. adhesive may contain a wax but preferably is wax-free. The EVA has a vinyl acetate content of from 11% to 40% by weight and a melt index of from 700 to 10,000 in a wax-free hot-melt system.

Other presently known references mention the use of EnBA copolymers in hot-melt applications. For example, "EnBA Resins Give Hot Melts More Heat and Oil Resistance" by D. Wielinski (*Adhesives Age,* November 1989, p. 30, et. seq.) notes that n-butyl acrylate may be substituted for vinyl acetate in an ethylene/vinyl acetate composition with consequential improvement in certain resin properties such as enhanced low temperature flexibility, oil resistance and heat stability. It is stated that n-butyl acrylate, as compared to vinyl acetate, can be employed at higher application temperatures, and has broader compatibility with a variety of tackifiers and waxes.

The article only discusses EnBA copolymers having a melt index of 400 or less. There is no indication that EnBA copolymers with a melt index in excess of 400 would be useful. Higher melt index copolymers, relative to those with a lower melt index, are capable of being applied at a lower temperature. As discussed more fully above, numerous advantages can be realized by hot-melt compositions with lower application temperature. Furthermore, higher melt index copolymers tend to be less viscous at a given temperature and, as a result, flow more easily and provide better substrate wetting. In general, these compositions are easier and safer to use.

U.S. Pat. No. 4,816,306 and its division U.S. Pat. No. 4,874,804, "Hot Melt Adhesive Based on Ethylene-N-Butyl Acrylate," each to Brady et al., disclose hot-melt adhesives based on EnBA copolymers. These patents disclose hot-melt compositions consisting essentially of 35% to 45% by weight of an EnBA copolymer, 35% to 55% of a terpene phenolic tackifier, and 10% to 20% by weight of a high melting synthetic wax that are especially useful in high speed, rapid-fire automated cardboard case and carton sealing equipment. The adhesive compositions were applied as a bead at 175° C. and subsequently compressed.

U.S. Pat. No. 3,615,106, "Manufacture of Hard Covered Books," issued Oct. 26, 1971 to Flanagan et al., discloses a hot-melt adhesive composition comprising 38% EnBA, 20% paraffin wax, 35% tackifying resin, and 7% polyethylene. The composition is useful in producing hard bound books. Preferably the EnBA has a melt index in the range of from about 1.0 to 20.0. The compositions are applied at temperatures of from about 300° to 400° F. to provide 5 to 30 mil thick wet coatings.

Thus, there is a need for a hot-melt composition which, when spread in a thin layer, has a limited open time of at least 5 seconds. Compositions with an open time of at least 5 seconds are needed when bonding large surface area substrates and precision components. However, the open time of such compositions should be limited. That is, they should not have a virtually infinite open time as do pressure sensitive adhesives so as to reduce the likelihood of dirt contamination on the edges of a substrate and the deterioration of bond strength which can occur if dirt contaminates the tacky substrate before bonding.

It would be advantageous if such compositions were creep-resistant, especially if used to bond precision components.

Several other characteristics would further contribute to the desirability of the hot-melt compositions. For example, it would be preferred if bonds could be formed without applying more than hand pressure or without supplying more heat than is generated by the application of hand pressure. A composition having such bond formation characteristics would be remarkably easy to use. Large, cumbersome heated presses would not be required to assemble components.

Presently known hot-melt compositions based on either EVA copolymers or EnBA copolymers do not demonstrate both a limited open time of at least 5 seconds and creep resistance when deposited as thin films on unheated (i.e., room temperature) substrates. Moreover, those compositions which are presently known do not exhibit these characteristics in combination with the ability to form bonds without applying heat or more than hand pressure.

SUMMARY OF THE INVENTION

The invention provides a hot-melt composition that can be deposited onto an unheated (i.e., approximately room temperature) substrate to form a thin layer about 50 to 250$\mu$ in thickness. The composition has a limited open time of at least 5 seconds at room temperature (approximately 20° to 22° C.) and then forms a creep-resistant bond without applying heat or more than hand pressure.

More particularly, hot-melt compositions according to the invention comprise an ethylene/vinyl acetate (EVA) copolymer, an ethylene/n-butyl acrylate (EnBA) copolymer, and a tackifying resin.

Preferably, the EVA copolymer comprises from about 14% to 35% vinyl acetate and has a melt index of at least 150. Preferably, the EnBA copolymer comprises from about 25% to 40% n-butyl acrylate and has a melt index of at least about 400. The EVA and EnBA copolymers are combined with 50 to 200 parts of a tackifying resin (per 100 parts total copolymer weight). The tackifying resin may be selected from the group consisting of polyterpene resins, hydrogenated wood rosins, hydrogenated hydrocarbons, aromatic hydrocarbons and the like as well as blends thereof. The tackifying resin preferably has a ring and ball softening point from 80° to 125° C. and a combined aromatic and olefinic from 0.5 to 50 mole %.

EnBA copolymers possess certain characteristics in terms of heat stability and the like that EVA copolymers may not even though EVA copolymers are widely used in hot-melt compositions. Blends of EVA and EnBA copolymers according to the invention combine the desirable and advantageous qualities of each.

For example, when a novel hot-melt composition according to the invention is melted so as to permit it to be spread onto an unheated (i.e. room temperature, about 20° to 22° C.) substrate it has a limited open time of at least five seconds, preferably at least 30 seconds without being virtually infinite like pressure sensitive adhesives. Within a few minutes the composition crystallizes so that the bond becomes creep-resistant. The compositions of the invention are extraordinarily easy to use and may be spread into thin layers at temperatures significantly lower than possible with prior hot-melt adhesives that developed creep resistance.

DETAILED DESCRIPTION OF THE PREFERRED EMBODIMENTS

This invention relates to hot-melt compositions based on ethylene/vinyl acetate (EVA) copolymers, ethylene/n-butyl acrylate (EnBA) copolymers and tackifying resins. In a preferred form, compositions according to the invention are employed as hot-melt adhesives. Although the following description focuses on the use of the compositions as hot-melt adhesives, it will be understood that they may also be useful as hot-melt coatings and sealants.

Hot-melt compositions according to the invention exhibit a combination of desirable properties not heretofore found in a single EVA-based or EnBA-based hot-melt composition. Compositions according to the invention have a limited open time or tack bonding range (time during which the compositions remain tacky at room temperature, about 20° to 22° C.). That is, compositions according to the invention have open times which exceed 5 seconds without being virtually infinite. Thus, compositions according to the invention display a tack bonding range which provides ample time for bonding large surface area substrates and precision components while minimizing the deleterious effects of dirt intrusion and other problems, as described more fully hereinabove.

The novel compositions described herein ultimately crystallize to form creep-resistant bonds (i.e., stable, failure-resistant bonds). Bonds made with compositions according to the invention may be formed without applying more than hand pressure or more heat than results from the application of hand pressure. Surprisingly, these features are attained even when the compositions are spread as thin films (about 50μ to 250 thick) onto unheated (i.e., room temperature) substrates, much to the contrary of presently known hot-melt compositions.

In addition to all of these advantages, compositions according to the invention can be applied with conventional applicators but at relatively low temperatures of about 260° F. (127° C.) or less, whereas most presently known hot-melt compositions have application temperatures in the range of about 350° to 400° F. (177° to 204° C.). Thus, hot-melt compositions according to the invention, as opposed to most of those which are presently known, are less likely to burn a user and can be employed with heat sensitive substrates.

The EVA copolymer preferably has a melt index greater than 500, more preferably between about 500 and 2500. If the melt index is less than about 500, hot-melt compositions made therefrom may be too viscous to be readily extruded or coated onto a substrate using conventional hot-melt composition dispensers at application temperatures of about 260° F. (127° C.) or less. It is believed that there is no effective upper limit on the melt index of EVA copolymers which may be used according to the invention, although the use of higher melt index copolymers may be practically limited by factors such as cost and commercial availability.

The vinyl acetate content of the EVA copolymer should be from about 14% to 35%, more preferably from about 23% to 30%. At a VA content substantially greater than about 35%, the compositions may be too soft and amorphous and may lose their capacity to form strong, creep-resistant bonds. However, if the VA content is substantially less than about 14%, the hot-melt compositions may not be sufficiently tacky (i.e., the open time becomes too short) when spread as a thin layer.

The EVA copolymers may include small amounts of other materials such as stabilizers, antioxidants, melt-index modifiers (e.g., isobutylene and propylene), and various reactive monomers such as acrylic acid and methacrylic acid which may be useful in modifying the physical properties of the copolymers. Preferably, these "other materials" comprise less than 10% by weight of the total copolymers. Representative examples of useful EVA copolymers include those tabulated below.

| Trade Designation | Source | Nominal % VA+ | Nominal Melt Index+ |
|---|---|---|---|
| EP 4969-6W | E. I. duPont* | 28 | 1000 |
| EP 4957-1W | E. I. duPont | 28 | 800 |
| EP 4969-2W | E. I. duPont | 28 | 800 |
| ESCORENE UL 7710 | Exxon Chem. Co. | 28 | 500 |
| ECORENE MV 02528 | Exxon Chem. Co. | 27.5 | 2500 |
| ULTRATHENE 647-35 | Quantum Chem. Corp. | 28 | 950 |
| ESCORENE MV 02514 | Exxon Chem. Co. | 14 | 2500 |
| AC 400 | Allied Chem. Corp. | 15 | NA |

NA = Not available
+ As reported by the manufacturer or supplier.
*E. I. duPont deNemours & Co.

The EnBA copolymer preferably has a melt index of at least 400, more preferably about 750. If the melt index is substantially less than 400, hot-melt compositions made therefrom may be too viscous to be readily extruded or coated onto a substrate using conventional hot-melt composition dispensers at application temperatures of about 260° F. (127° C.) or less. It is believed that there is no effective upper limit on the melt index of EnBA copolymers which may be used according to the invention, although the use of higher melt index copolymers may be practically limited by factors such as cost and commercial availability.

The n-butyl acrylate (BA) content of the EnBA copolymer should be from about 25% to 40%, more preferably from about 30% to 38%. At a BA content substantially greater than about 40%, the compositions may be too soft and amorphous and may lose their capacity to form strong, creep-resistant bonds. However, if the BA content is substantially less than about 25%, the hot-melt compositions may not be sufficiently tacky (i.e., the open time becomes too short) when spread as a thin layer.

The EnBA copolymers may include small amounts of other materials such as stabilizers, antioxidants, melt-index modifiers (e.g., isobutylene and propylene), and various reactive monomers such as acrylic acid and methacrylic acid which may be useful in modifying the physical properties of the copolymers. Preferably, these "other materials" comprise less than 10% by weight of the total copolymers. Representative examples of useful EnBA copolymers include:

| No. | Trade Designation | Source | Nominal % BA+ | Nominal Melt Index+ |
|---|---|---|---|---|
| A | EA-89822 | Quantum Chem. Corp. | 35 | 400 |
| B | E-61382-48 | E. I. duPont* | 30 | 750 |
| C | E-63952-100B | E. I. duPont | 25 | 750 |
| D | E-63952-100C | E. I. duPont | 35 | 750 |
| E | E-63952-100D | E. I. duPont | 40 | 750 |

+As reported by the manufacturer of supplier.
*E. I. duPont deNemours & Co.

EnBA copolymers B, C, D and E, as commercially available, includes small amounts (about 1% to 2%) of methacrylic acid. Acid modified (for example, using methacrylic acid) copolymers are especially useful when enhanced heat resistance and elevated temperature strength are desired and are particularly well suited for use with low melting point tackifying resins.

A wide variety of tackifying resins (sometimes referred to herein as tackifiers) may be used in accordance with the invention. Representative tackifiers and/or tackifiers used to prepare the following examples, are tabulated below.

| No. | Trade Designation | Source | Arom./olef. content (mole %) | Nom. Soft. Point (°C.) | Description |
|-----|-------------------|--------|------------------------------|------------------------|-------------|
| A | CLEARON P-85 | Yashuhara Yushi* | 2.8 | 85 | hydrog. polyterpene |
| B | CLEARON P-115 | Yashuhara Yushi | 2.8 | 115 | hydrog. polyterpene |
| C | KRISTALEX 3085 | Hercules Inc. | 68.1 | 85 | methylstyrene |
| D | HERCOTAC LA 95 | Hercules Inc. | 42.9 | 93 | arom. hydrocarbon |
| E | REGALREZ 1094 | Hercules Inc. | 0 | 94 | hydrog. hydrocarbon |
| F | PICCOLYTE HM106 | Hercules Inc. | 40 | 105 | arom. mod. terpene |
| G | ESCOREZ 5320 | Exxon Chem. | NT | 120 | hydrog. hydrocarbon |
| H | ESCOREZ 149A | Exxon Chem. | 16 | 105 | arom. mod. alip. hydrocarbon |
| I | ARKON M135 | Arakawa | 20 | 135 | hydrog. hydrocarbon |
| J | PICCOLYTE HM90 | Hercules Inc. | 25 | 90 | arom. mod. terpene |

NT = not tested
*Yashuhara Yushi Kogyo Co., Ltd.

The saturated aliphatic content of each tackifying resin is the difference between 100% and the aromatic/olefinic content ("Arom/olef. content") given above.

To provide the above-described extraordinary combination of protracted aggressive tackiness at room temperature and creep-resistant bonding, it is believed that there must be some compatibility between the tackifying resin and each of the ethylene, vinyl acetate and n-butyl acrylate moieties. Preferred compatibility between the tackifying resin and the ethylene moieties of the EVA and EnBA copolymers should be realized when the tackifying resin has a combined aromatic and olefinic content of at least 0.5 mole % as determined by carbon-13 NMR analysis (nuclear magnetic resonance spectroscopy also known as magnetic resonance imaging). However, when the aromatic/olefinic content substantially exceeds 50 mole %, the tackifying resin may not be sufficiently compatible with the vinyl acetate and n-butyl acrylate moieties. The preferred aromatic/olefinic content range is from 2 to 30 mole %. Enhanced compatibility also improves clarity of the adhesive for aesthetic purposes and, when clarity is important, no more than 50 mole % of the saturated aliphatic content of the tackifying resin should be cycloaliphatic. The aromatic/olefinic content may be determined by analytical techniques other than carbon-13 NMR, although it is expected that the results from different approaches will be consistent.

The nominal ring and ball softening point ("Nom. Soft. Point") (as determined by ASTM test method E-28) of the tackifying resin preferably is no less than 80° C., more preferably in the range of 80° to 115° C..

Preferred tackifying resins for use in conjunction with blends of EVA and EnBA copolymers include polyterpene resins, hydrogenated wood rosins, and derivatives thereof such as a water-white hydrogenated polyterpene resin series having ring and ball softening points between about 80° and 125° C.. Examples of tackifying resins useful in the invention in addition to those tabulated above include the following: CLEARON P-105 and CLEARON P-125 (Yashuhara Yushi Kogyo Co., Ltd.), and HM90, REGALREZ 1078, REGALITE M-355, and REGALITE 7070 (Hercules, Inc.).

Preferably there are from 120 to 170 parts of the tackifying resin per 1100 parts of the EVA/EnBA copolymer blend. Above 170 parts, bonds made with the novel hot-melt adhesives may afford less resistance to impact, while below 120 parts, deposited layers of the adhesives may be less tacky.

Hot-melt compositions according to the invention may be formulated by blending together the EVA and EnBA copolymers with a tackifying resin. In general, the EVA and EnBA copolymers employed in such blends should individually satisfy the copolymer criteria described hereinabove. Blends of EVA and EnBA copolymers take advantage of the particular properties possessed by the individual components. For example, hot-melt compositions based on EVA copolymers are well known but compositions based on EnBA copolymers may offer different properties. Such different properties include better bond strength at elevated temperatures, better overall performance at high temperatures, enhanced mechanical flexibility of bonds made therewith, and more aggressive tack. In certain instances, adhesive compositions formulated only with EnBA and an appropriate tackifying resin may be too soft to be readily handled and may not function well in adhesive applications requiring relatively stiff or rigid rods of adhesive. In other cases, the commercial availability and/or cost of one of the two components may warrant the use of a blend.

In addition to an EnBA copolymer and a tackifying resin, hot-melt compositions according to the invention may also comprise small amounts of other additives that have customarily been used in hot-melt formulations such as antioxidants, stabilizers, ultraviolet absorbers, pigments, fillers, viscosity reducers (for example, plasticizers, and the like), polymeric bubbles, polymeric hollow microspheres, glass bubbles or beads, ceramic bubbles, and metal-coated ceramic or glass bubbles. These additives should only be present in an amount that does not materially adversely affect the tack bonding range, ultimate bond strength, or heat resistance of the composition. Typically the total amount of such additives does not exceed about 25% by weight of the hot-melt composition.

Hot-melt compositions according to the invention may be prepared by mixing the components thereof at a temperature somewhat above their softening points under an inert atmosphere blanket. The resulting hot-melt compositions may be converted into rods, cylinders, slugs, billets or pellets and dispensed directly from known melt reservoir bulk hot-melt applicators or pail unloaders. They may also be sprayed or blown to form webs. Alternatively, they may be coated or extruded onto a release liner to form reactivatable films. Preferably, the hot-melt compositions are provided as sticks or rods that may be mechanically or pneumatically supplied to the heated well or chamber of a "glue gun" type dispenser such as those illustrated in U.S. Pat. Nos. 4,621,748 and 4,457,457, each to Dziki. Compositions according to the invention which are too soft to be readily formed into a stick or rod that can be supplied to a "glue gun" may still be dispensed therefrom by using a cartridge containing the composition, as will be understood by those skilled in the art.

Preferably, the hot-melt compositions are applied to a substrate in a thin (about 50 to 250μ, more preferably 50 to 125μ) layer at a temperature of about 260° F. (127° C.) or less although temperatures in excess of this may be required depending on the physical characteristics of the particular hot-melt composition. (These temperatures do not refer to the actual temperature of the dispensed adhesive, but rather to the thermostat temperature of the hot-melt "glue gun" applicator.) Once the composition has been applied to the substrate, the substrate is mated with a second surface while the adhesive remains tacky. The substrate and the second surface can be successfully mated by applying no more than hand pressure or no more heat than results from the application of hand pressure (sometimes referred to herein as applying "hand pressure") to form a creep-resistant bond.

Heat which is necessary to form the bond between the substrate and the second surface is to be distinguished from the heat which is necessary to apply or activate the hot-melt composition in the first instance. The hot-melt compositions of the invention, like those which are presently known, are provided as solid materials which must be heated to melt and activate them ("the heat of activation") so that they can be supplied as viscous liquids to a substrate. This heat is typically provided by a hot-melt applicator such as a "glue gun."

Advantageously, however, once the hot-melt compositions of the invention are applied to an unheated (room temperature) substrate, a bond may be formed with a second surface merely by applying hand pressure (or no more heat than results from the application of hand pressure). Other hot-melt compositions which are presently known, require the application of substantial heat and/or pressure to form a bond once the composition has been deposited on a substrate.

Hot-melt compositions according to the invention may also be formulated as sticks which can be applied by hand. The sticks themselves are nontacky but when rubbed against an unheated substrate deposit a thin layer of adhesive which has an open time of at least 5 seconds. The heat of activation is generated by the friction which results from rubbing the stick against the substrate. A subsequent bond to a second surface may be made merely by applying hand pressure. Such bonds have sufficient strength to tear paper. Because these hand sticks require a relatively small amount of heat to activate the hot-melt composition, the thin layer of deposited adhesive may be readily reactivated. That is, once the adhesive has been deposited onto a substrate it becomes nontacky once its open time is exceeded. However, such adhesives can be readily restored to a tacky state by merely rubbing the deposited layer. Once the adhesive has been returned to a tacky condition, a bond to a second surface may be made in the usual manner as described herein.

The inventive compositions may also be applied as nontacky coatings for a substrate. If, after application to a substrate, the coating becomes nontacky, it can be subsequently reactivated by heating or rubbing, either before or after being contacted with a material to be bonded thereto. Hot-melt compositions which behave in this manner are especially useful in preparing large surface area panels for intermediate storage before ultimate assembly, such as described hereinabove with regard to advertising displays and the like.

Hot-melt compositions according to the invention exhibit a tack bonding range of at least 5 seconds when deposited as a layer about 50 to 250μ thick on an unheated substrate. However, the hot-melt compositions do not have a virtually infinite open time as do pressure sensitive adhesives. Thus, hot-melt compositions according to the invention may be regarded as having a limited open time of at least 5 seconds.

Tack bonding range was determined by depositing an approximately 100μ thick, 1.9 centimeter (cm) wide layer of the hot-melt composition at about 260° F. (127° C.) (thermostat temperature) onto ordinary white, 20 lb. bond typing paper otherwise maintained at room temperature (about 20° to 22° C.). (Layer thickness varied somewhat due to slight differences in application technique.) A second sheet of the same paper was placed over the deposited layer and a 2.2 kilogram (kg) roller was passed over the sheets once at a speed of about 7.5 cm/second. The bonded sheets were immediately subjected to a 180° peel at a separation rate of 30 cm/minute. Paper delamination or tearing occurred at approximately 12 newtons. The maximum time between depositing the layer and passing the roller that results in tearing of the paper is the open time or tack bonding range of the composition. Thus, the tack bonding range is a measure of the time during which the adhesive remains tacky after having been applied to a room temperature substrate.

Bonds formed with hot-melt compositions according to the invention ultimately crystallize and become creep-resistant. Creep refers to the dimensional change a material undergoes as a function of time when the material is under a sustained load. (A material which creeps moves slowly under stress.) An article bonded to a substrate by a creep-resistant adhesive will remain in place and will not move or slip, a particularly important attribute for bonding precision components. Creep resistance is measured by ASTM Test Method D3654 except that the adhesive is deposited as an approximately 100μ layer onto polyester film from a hot-melt adhesive dispenser and the mass suspended from the film is 1 kg. (Layer thickness varied somewhat due to slight differences in application technique.) The test is sometimes discontinued after 10,000 minutes if no failure occurs. A creep-resistant bond will not fail at 1,000 minutes and preferably will not fail at 10,000 minutes.

The tackiness and creep resistance of hot-melt compositions according to the invention may also be assessed with reference to the shear storage modulus (G') (compression modulus) of the composition. Shear storage modulus is the ratio of stress to strain for the composition. A layer of adhesive about 50μ thick is sufficiently tacky to form bonds under ordinary hand pressure at room temperature when its shear storage modulus is less than $1 \times 10^6$ dynes/cm$^2$ and can do so more easily when its shear storage modulus is less than $7 \times 10^5$ dynes/cm$^2$. After the shear storage modulus of the adhesive layer has increased above $5 \times 10^6$ dynes/cm$^2$, a bond which was made when the adhesive was tacky may be creep-resistant. To assure good creep resistance, the ultimate shear storage modulus should be at least $1 \times 10^7$ dynes/cm². For a discussion of shear storage modulus see Satas, *Handbook of Pressure-Sensitive Adhesive Technology*, Van Nostrand Reinhold Co., New York, 1982, pp. 82-83.

The invention will be more fully appreciated with reference to the following illustrative and nonlimiting examples which are intended to set forth the unique characteristics of the hot-melt compositions. In the examples all parts ("amounts") are by weight unless specified otherwise.

GENERAL PREPARATION

Various hot-melt compositions were prepared for the following examples. In general, an EVA copolymer, an EnBA copolymer and a tackifying resin were heated under a nitrogen blanket to about 149° C. with hand mixing. After about 5 minutes at this temperature, the melt was poured into a mold and allowed to cool to provide a toothed rod of adhesive as illustrated in U.S. Pat. No. 4,621,748 (Dizki). Various examples were tested for tack bonding range, and creep resistance according to the procedures described above. The compositions of the examples were deposited onto substrates using conventional, commercially available hot-melt applicators.

EXAMPLES 1-3

A series of hot-melt compositions was prepared according to the general preparation by blending EP 4969-6W (EVA) with EnBA copolymer B in varying proportions (ratios 1:3, 1:1 and 3:1) as shown in Table I. 100 parts of these various blends were combined with 150 parts of tackifying resin A. Testing is reported below in Table I.

The hot-melt compositions of examples 1 to 3 were also formulated into non-tacky sticks, which, when rubbed against a piece of ordinary typing paper, deposited a thin layer of adhesive which had an open time of about 5 seconds. When a second piece of the same kind of paper was bonded to the adhesive, the resulting bonds were sufficiently strong to tear the paper.

TABLE I

| Example No. | EVA Copolymer Amount | EnBA Copolymer Amount | Tack Bonding Range (Sec.) | Creep Resistance (Min.) |
|---|---|---|---|---|
| 1 | 25 | 75 | 35 | >10,000 |
| 2 | 50 | 50 | 35 | >10,000 |
| 3 | 75 | 25 | 35 | >10,000 |

EXAMPLES 4-14

A series of hot-melt compositions comprising equal parts of EP 4969-6W (EVA) and various EnBA copolymers was prepared in accordance with the general preparation. A melt of each copolymer blend and 150 parts of various tackifying resins per 100 parts of the copolymer melt was formed into toothed rods and tested with the results shown in Table II below.

TABLE II

| Example No. | EVA Copolymer Amount | EnBA Copolymer No. | EnBA Copolymer Amount | Tackifying Resin No. | Tack Bonding Range (Sec.) | Creep Resistance (Min.) |
|---|---|---|---|---|---|---|
| 4 | 50 | C | 50 | A | 20 | >10,000 |
| 5 | 50 | D | 50 | A | 90 | >10,000 |
| 6 | 50 | E | 50 | A | 135 | >10,000 |
| 7 | 50 | B | 50 | A | 35 | >10,000 |
| 8 | 50 | B | 50 | B | 25 | >10,000 |
| 9 | 50 | B | 50 | E | 0 | NT |
| 10 | 50 | B | 50 | J | 45 | >10,000 |
| 11 | 50 | B | 50 | D | 20 | >10,000 |
| 12 | 50 | B | 50 | C | 0 | NT |
| 13 | 50 | B | 50 | I | 0 | NT |
| 14 | 50 | A | 50 | A | 35 | >10,000 |

NT = Not tested

Table II illustrates that hot-melt compositions comprising equal amounts of EVA and EnBA copolymers and a tackifying resin have a tack bonding range which exceeds 5 seconds at room temperature and can crystallize to form creep-resistant bonds. Preferably the tackifying resin has a softening point from about 80° C. to 125° C. and an aromatic olefinic content from about 0.5 to 50 mole % (more preferably from about 2 to 30 mole %). Preferably the EnBA copolymer has from about 25% to 40% n-butyl acrylate.

EXAMPLE 15

An adhesive composition comprising 75 parts EP 4969-6W (EVA) 25 parts EnBA copolymer A, and a tackifying resin comprising 35 parts tackifying resin F, 52.5 parts tackifying resin G, and 52.5 parts tackifying resin H was prepared. The composition displayed a tack bonding range of 35 seconds and a creep resistance greater than 10,000 minutes. This example shows that blends of different tackifying resins may be used.

Reasonable variations or modifications are possible within the spirit of the foregoing specification without departing from the scope of the invention which is defined in the accompanying claims.

The embodiments for which an exclusive property or privilege is claimed are defined as follows:

1. A hot-melt composition comprising an ethylene/vinyl acetate copolymer having a melt index of at least 500 and comprising a total of 23% to 35% vinyl acetate, an ethylene/n-butyl acrylate copolymer, and a tackifying resin, wherein said composition has a limited open time of at least 5 seconds when deposited in a thin layer on a room temperature substrate.

2. A hot-melt composition according to claim 1 wherein said ethylene/n-butyl acrylate copolymer has a melt index of at least about 400.

3. A hot-melt composition according to claim 2 wherein said ethylene/n-butyl acrylate copolymer comprises from about 25% to 40% n-butyl acrylate.

4. A hot-melt composition according to claim 1 wherein said ethylene/vinyl acetate copolymer has a melt index of from 500 to 2500.

5. A hot-melt composition according to claim 1 wherein said ethylene/vinyl acetate copolymer comprises from 23% to 30% vinyl acetate.

6. A hot-melt composition according to claim 1 wherein said tackifying resin has a nominal ring and ball softening point of from about 80° C. to 125° C.

7. A hot-melt composition according to claim 6 wherein said tackifying resin has a combined aromatic and olefinic content of from about 0.5 to 50 mole %.

8. A hot-melt composition according to claim 7 wherein said tackifying resin has a combined aromatic and olefinic content of from about 2 to 30 mole %.

9. A hot-melt composition according to claim 1 wherein said tackifying resin comprises from about 120 parts to 170 parts per 100 parts combined weight of said ethylene/vinyl acetate and ethylene/n-butyl acrylate copolymers.

10. A hot-melt composition according to claim 1 wherein the ratio of said ethylene/vinyl acetate copolymer to said ethylene/n-butyl acrylate copolymer is in the range of from 1:3 to 3:1.

11. A hot-melt composition according to claim 1, wherein said composition has a creep resistance of at least 1,000 minutes.

12. A hot-melt composition according to claim 11, wherein said composition has a creep resistance of at least 10,000 minutes.

13. An article, comprising a substrate having a layer of a hot-melt composition according to claim 1 thereon.

14. An article according to claim 13, wherein said layer of said composition has a thickness of about 50 to 250 μ.

15. An article according to claim 14 wherein said layer of said composition has a thickness of about 50 to 125 μ.

16. An article according to claim 15 wherein said substrate is a release liner.

17. An adhesive rod comprising a hot-melt composition which comprises
(a) an ethylene/vinyl acetate copolymer having from 14% to 35% vinyl acetate and a melt index of at least 500,
(b) an ethylene/n-butyl acrylate copolymer having from 25% to 40% n-butyl acrylate, and
(c) from 120 to 170 parts of a tackifying resin per 100 parts combined weight of (a)+(b), said tackifying resin having a ring and ball softening point of from 80° C. to 120° C. and a combined aromatic and olefinic content of at least 0.5 mole %
wherein said hot-melt composition has a limited open time of at least 5 seconds when deposited on a room temperature substrate in a thin layer.

18. An adhesive rod according to claim 17 wherein said hot-melt composition has a creep resistance of at least 10,000 minutes.

19. An adhesive rod according to claim 18 wherein said rod may be pneumatically or mechanically delivered to a heated well of a hot-melt composition applicator.

20. An adhesive rod according to claim 17 wherein the layer of said hot-melt composition on said substrate is about 50 to 250μ.

21. An adhesive rod according to claim 17 wherein said rod may be manually rubbed against a substrate to deposit a thin layer of the hot-melt composition thereon.

22. A hot-melt composition comprising an ethylene/vinyl acetate copolymer, an ethylene/n-butyl acrylate copolymer having a melt index of at least about 400, and a tackifying resin, wherein said composition has a limited open time of at least 5 seconds when deposited in a thin layer on a room temperature substrate.

23. A hot-melt composition according to claim 22 wherein said ethylene/n-butyl acrylate copolymer comprises from about 25% to 40% n-butyl acrylate.

24. A hot-melt composition according to claim 22 wherein said ethylene/vinyl acetate copolymer has a melt index of from 500 to 2500.

25. A hot-melt composition according to claim 24 wherein said ethylene/vinyl acetate copolymer comprises from 14% to 35% vinyl acetate.

26. A hot-melt composition according to claim 22 wherein said tackifying resin has a nominal ring and ball softening point of from about 80° C. to 125° C.

27. A hot-melt composition according to claim 26 wherein said tackifying resin has a combined aromatic and olefinic content of from about 2 to 30 mole %.

28. A hot-melt composition according to claim 22 wherein said tackifying resin comprises from about 120 parts to 170 parts per 100 parts combined weight of said ethylene/vinyl acetate and ethylene/n-butyl acrylate copolymers.

29. A hot-melt composition according to claim 22 wherein the ratio of said ethylene/vinyl acetate copolymer to said ethylene/n-butyl acrylate copolymer is in the range of from 1:3 to 3:1.

30. A hot-melt composition according to claim 22 wherein said composition has a creep resistance of at least 1,000 minutes.

31. An adhesive rod comprising a hot-melt composition which comprises
(a) an ethylene/vinyl acetate copolymer having from 14% to 35% vinyl acetate,
(b) an ethylene/n-butyl acrylate copolymer having from 25% to 40% n-butyl acrylate and a melt index of at least 400, and
(c) from 120 to 170 parts of a tackifying resin per 100 parts combined weight of (a)+(b), said tackifying resin having a ring and ball softening point of from 80° C. to 120° C. and a combined aromatic and olefinic content of at least 0.5 mole %
wherein said hot-melt composition has a limited open time of at least 5 seconds when deposited on a room temperature substrate in a thin layer.

32. An adhesive rod according to claim 31 wherein the ethylene/vinyl acetate copolymer has a melt index of at least 500.

33. A hot-melt composition comprising an ehtylene/vinyl acetate copolymer, an ethylene/n-butyl acrylate copolymer having from about 25% to 40% n-butyl acrylate, and a tackifying resin, wherein said composition has an open time of 5 seconds to about 135 seconds when deposited in a thin layer on a room temperature substrate.

34. A hot-melt composition according to claim 33 wherein said ethylene/n-butyl acrylate copolymer has a melt index of at least about 400.

35. A hot-melt composition according to claim 33 wherein said ethylene/vinyl acetate copolymer has a melt index of at least 500.

36. A hot-melt composition according to claim 35 wherein said ethylene/vinyl acetate copolymer comprises from 14% to 35% vinyl acetate.

37. A hot-melt composition according to claim 27 wherein said tackifying resin has a nominal ring and ball softening point of from about 80° C. to 125° C.

38. A hot-melt composition according to claim 33 wherein said tackifying resin comprises from about 120 parts to 170 parts per 100 parts combined weight of said ethylene/vinyl acetate and ethylene/n-butyl acrylate copolymers.

39. A hot-melt composition according to claim 33 wherein the ratio of said ethylene/vinyl acetate copolymer to said ethylene/n-butyl acrylate copolymer is in the range of from 1:3 to 3:1.

40. A hot-melt composition according to claim 33 wherein said composition has a creep resistance of at least 10,000 minutes.

41. A hot-melt composition according to claim 33 wherein said composition is in the form of a rod.

* * * * *

UNITED STATES PATENT AND TRADEMARK OFFICE
CERTIFICATE OF CORRECTION

PATENT NO. : 5,310,803
DATED : May 10, 1994
INVENTOR(S) : Dennis D. Hansen

It is certified that error appears in the above-indentified patent and that said Letters Patent is hereby corrected as shown below:

```
Title "COMPOSITION" should read --COMPOSITIONS--.
Col. 1, line 2, "COMPOSITION" should read --COMPOSITIONS--.
Col. 4, line 43, "EVA 7 and EVA" should read --EVA and EVA--.
Col. 8, line 9, "ECORENE" should read --ESCORENE--.
Col. 9, line 67, "1100" should read --100--.
Col. 16, line 50, "ehtylene" should read --ethylene--.
Col. 16, line 55, "ir" should read --in--.
```

Signed and Sealed this

Eighth Day of November, 1994

Attest:

BRUCE LEHMAN

*Attesting Officer*    *Commissioner of Patents and Trademarks*